United States Patent [19]
Naganuma et al.

[11] Patent Number: 5,801,892
[45] Date of Patent: Sep. 1, 1998

[54] OPTICAL DEVICE HAVING AN OPTICAL FILM WITH AN INCIDENT ANGLE THEREUPON VARIABLE

[75] Inventors: Norihisa Naganuma, Sapporo; Nobuhiro Fukushima, Kawasaki, both of Japan

[73] Assignee: Fujitsu Limited, Kawasaki, Japan

[21] Appl. No.: 674,515

[22] Filed: Jul. 2, 1996

[30] Foreign Application Priority Data

Oct. 31, 1995 [JP] Japan .................. 7-282981

[51] Int. Cl.$^6$ .................. G02B 5/22; G02B 6/26; G02B 6/38
[52] U.S. Cl. .................. 359/892; 385/60; 385/25
[58] Field of Search .................. 356/150; 385/25, 385/28, 33, 60, 66, 71, 72, 15, 27, 31, 34, 35, 39, 49, 73, 74, 75, 92, 93; 359/811, 114, 341, 892

[56] References Cited

U.S. PATENT DOCUMENTS

| | | | |
|---|---|---|---|
| 4,197,008 | 4/1980 | Pinnow et al. | 356/150 |
| 4,548,478 | 10/1985 | Shirasaki | 350/377 |
| 4,617,338 | 10/1986 | Kraus | 356/414 |
| 4,995,696 | 2/1991 | Nishimura et al. | 350/96 |
| 5,287,214 | 2/1994 | Robertson et al. | 359/260 |
| 5,402,509 | 3/1995 | Fukushima | 385/33 |
| 5,416,867 | 5/1995 | Thorsten et al. | 385/73 |
| 5,579,420 | 11/1996 | Fukushima | 385/11 |

FOREIGN PATENT DOCUMENTS 0 552 394 A 7/1993 European Pat. Off.

*Primary Examiner*—Frank G. Font
*Assistant Examiner*—Michael P. Stafira
*Attorney, Agent, or Firm*—Staas & Halsey

[57] ABSTRACT

An optical device having a collimating mechanism for converting light emitted from an excitation port into a parallel beam and outputting the parallel beam onto an optical path, an optical film provided so as to pass the parallel beam output from the collimating mechanism, and a supporting mechanism for supporting the optical film so that the optical film is rotatable about an axis inclined with respect to the optical path. The optical film is inclined with respect to a plane perpendicular to the axis. An incident angle of the parallel beam upon the optical film can be changed by rotating the optical film about the axis. Thus, the optical device having the optical film that can vary the incident angle thereupon can be provided with a simple structure.

37 Claims, 8 Drawing Sheets

5,801,892

OPTICAL DEVICE HAVING AN OPTICAL FILM WITH AN INCIDENT ANGLE THEREUPON VARIABLE

BACKGROUND OF THE INVENTION

1. Field of the Invention

The present invention relates generally to an optical device applicable to an optical system such as an optical communication system, and more particularly to a structure for varying an incident angle upon an optical film included in the optical device.

2. Description of the Related Art

In recent years, an optical communication system employing a silica fiber as an optical transmission line has been put to practical use, and it is therefore desired to reduce the size and cost of an optical device applied to this kind of system.

It is known that when an optical film consisting of a single layer or multiple layers whose refractive index is different from an optical medium for propagating a light beam is located in the optical medium, the optical film functions as a band-pass filter, long-wave pass filter, short-wave pass filter, etc. For example, a band-pass filter used in an optical communication system is obtained by alternately laminating low-refractive index layers and high-refractive index layers each having a predetermined thickness. The low-refractive index layers and the high-refractive index layers are formed of $SiO_2$ and $TiO_2$, respectively, for example.

Known is an optical amplifier including a doped fiber doped with a rare-earth element such as Er (erbium). In the optical amplifier, a band-pass filter having a high-accuracy characteristic is often used, so as to extract amplified signal light from unnecessary noise light. In a wavelength-division multiplexing (WDM) system, a band-pass filter having a high-accuracy characteristic is required to add up a plurality of optical signals on neighboring wavelength channels or select an optical signal on a desired channel.

In manufacturing an optical film, the high-accuracy characteristic thereof can be obtained by accurately controlling the thickness of the optical film or the thickness of each layer when the optical film is a multilayer film. However, in manufacturing a band-pass filter, for example, it is difficult to control the transmission center wavelength with a high accuracy on the order of 1 nm by the manufacturing technique only. Accordingly, the characteristic of the optical film is finely adjusted conventionally not only by controlling the thickness of the optical film in manufacturing it, but also by adjusting an incident angle of light upon the optical film after manufactured to thereby change an equivalent optical thickness of the optical film. However, a mechanism for varying the incident angle upon the optical film tends to be large in size and complex in structure, so that an optical device having such a mechanism is increased in size and cost.

SUMMARY OF THE INVENTION

It is therefore an object of the present invention to provide an optical device having an optical film that can vary an incident angle thereupon which is fit for a reduction in size and cost.

In accordance with the present invention, there is provided an optical device comprising a collimating means for converting light emitted from an excitation port into a parallel beam and outputting the parallel beam onto an optical path; an optical film provided so as to pass the parallel beam output from the collimating means; and a supporting means having an axis inclined with respect to the optical path, for supporting the optical film so that the optical film is rotatable about the axis; the optical film being inclined with respect to a plane perpendicular to the axis.

In the optical device of the present invention, an incident angle of the parallel beam upon the optical film can be changed by rotating the optical film about the axis of the supporting means. Accordingly, the incident angle upon the optical film can be changed with a simple structure, thereby allowing a reduction in size and cost of the optical device.

Letting the angle formed between the optical path and the axis be referred to as a first inclination angle and the angle formed between the optical film and the plane be referred to as a second inclination angle, the upper limit of a variable range of the incident angle upon the optical film is given by the sum of the first inclination angle and the second inclination angle, and the lower limit of the variable range is given by the absolute value of the difference between the first inclination angle and the second inclination angle.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Some preferred embodiments of the present invention will now be described in detail with reference to the drawings.

Figure 1:
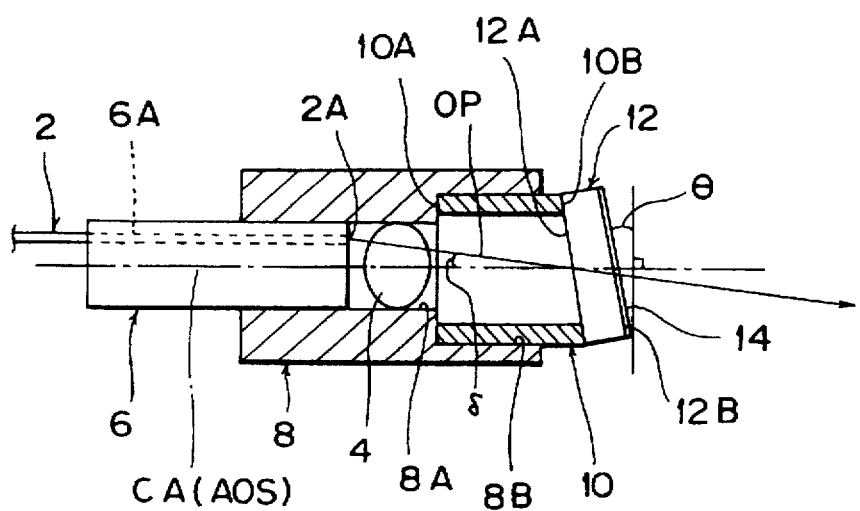
FIG. 1 is a longitudinal sectional view of an optical device showing a first preferred embodiment of the present invention.

FIG. 1 is a longitudinal sectional view of an optical device showing a first preferred embodiment of the present invention. An excitation port is given by an excitation end 2A of an optical fiber 2. Light propagated in the optical fiber 2 is emitted from the excitation end 2A. A collimating means for converting the light emitted from the excitation end 2A into a parallel beam and outputting the parallel beam onto an optical path OP includes a lens 4 opposed to the excitation end 2A. The collimating means further includes a ferrule 6 having a fine hole 6A in which the optical fiber 2 is inserted, and a sleeve 8 for supporting the ferrule 6 and the lens 4. The optical fiber 2 is fixed in the fine hole 6A so that the excitation end 2A is flush with an end surface of the ferrule 6. The fixing of the optical fiber 2 is effected by using an optical adhesive, for example.

The sleeve 8 has an insert hole 8A having a relatively small diameter and an insert hole 8B having a relatively large diameter. In this preferred embodiment, the insert holes 8A and 8B are coaxial with each other. The lens 4 is fixed in the insert hole 8A by press fitting, for example. The ferrule 6 is inserted in the insert hole 8A up to a depth such that the light emitted from the excitation end 2A is converted into a substantially parallel beam by the lens 4, and the ferrule 6 inserted in the insert hole 8A is fixed to the sleeve 8 by laser welding, for example. The ferrule 6 has a virtual center axis CA, and the fine hole 6A is eccentric from the center axis CA. Accordingly, the optical path OP of the parallel beam output from the collimating means is inclined with respect to the center axis CA.

A supporting means for supporting an optical film 14 has a virtual axis AOS inclined with respect to the optical path OP. The optical film 14 is rotatable about the axis AOS. The supporting means includes a sleeve 10 having an outer diameter slightly smaller than the diameter of the insert hole 8B of the sleeve 8. One end surface 10A of the sleeve 10 is perpendicular to the axis AOS of the supporting means, and the other end surface 10B of the sleeve 10 is inclined with respect to a plane perpendicular to the axis AOS. The sleeve 10 is slidably rotatably inserted in the sleeve 8 so that the end surface 10A abuts against a shoulder formed between the insert hole 8A and the insert hole 8B of the sleeve 8. Since the insert holes 8A and 8B are coaxial with each other in this preferred embodiment, the axis AOS of the supporting means coincides with the center axis CA of the ferrule 6. Alternatively, the insert hole 8B may be made eccentric from the insert hole 8A to make the axis AOS not coincide with the center axis CA and make them parallel to each other. The supporting means further includes a transparent plate 12 formed of glass or the like. The transparent plate 12 has a first surface 12A whose outer circumferential portion is fixed to the inclined end surface 10B of the sleeve 10, and a second surface 12B on the substantially whole of which the optical film 14 is formed. The first surface 12A and the second surface 12B are parallel to each other in this preferred embodiment.

Owing to the configuration that the sleeve 10 has the inclined end surface 10B and that the opposite end surfaces 12A and 12B of the transparent plate 12 are parallel to each other, the optical film 14 is inclined with respect to the axis AOS of the supporting means. The optical film 14 may be a dielectric multilayer film formed by alternatively laminating low-refractive index layers of $SiO_2$ and high-refractive index layers of $TiO_2$, for example. On the basis of the configuration that the axis AOS of the supporting means as the center of rotation of the optical film 14 is inclined with respect to the optical path OP and that the optical film 14 is inclined with respect to a plane perpendicular to the axis AOS, an angle of incidence upon the optical film 14 can be changed by rotating the sleeve 10 relative to the sleeve 8. In general, an angle of incidence is defined as an angle formed between an incident light ray upon a boundary surface between two media different in refractive index and a perpendicular to the boundary surface at a point of incidence.

There will now be described the principle of making variable the incident angle upon the optical film 14 and the variable range of the incident angle. Referring to FIG. 1, reference symbol δ represents an angle of inclination of the axis AOS of the supporting means with respect to the optical path OP, and reference symbol θ represents an angle of inclination of the optical film 14 with respect to a plane perpendicular to the axis AOS. In the relative positional relation between the sleeve 8 and the sleeve 10 wherein the sleeve 10 is rotatable relative to the sleeve 8, the condition that a plane containing both the optical path OP and the axis AOS of the supporting means is perpendicular to the optical film 14 is satisfied in the following two cases.

Figure 2A:
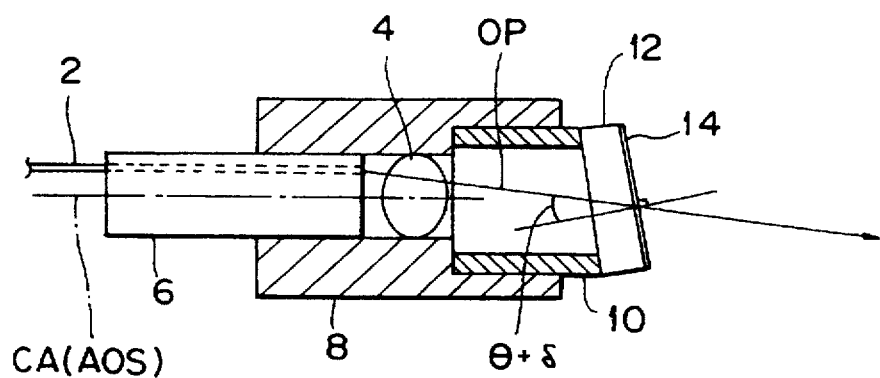
FIGS. 2A and 2B are views similar to FIG. 1, illustrating a variable range of an incident angle upon an optical film in the first preferred embodiment.
Figure 2B:
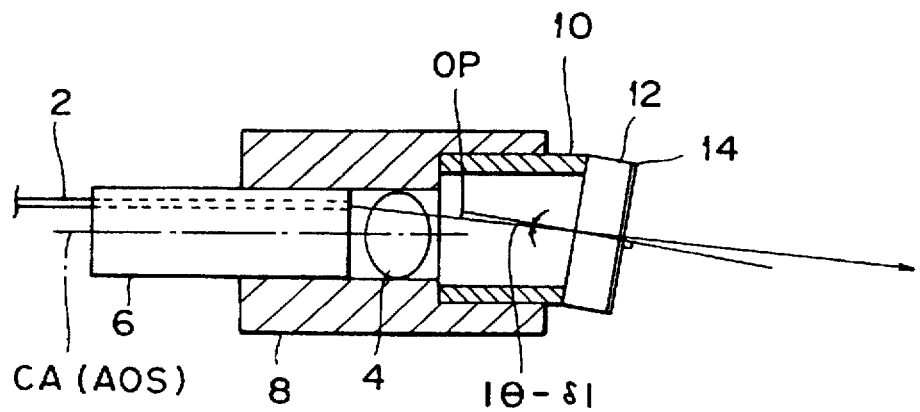

FIGS. 2A and 2B show the two cases where the above condition is satisfied. If the lens 4, the ferrule 6, and the sleeve 8 are the same in position between the two cases, the rotational position of the sleeve 10 shown in FIG. 2B corresponds to a position obtained by rotating the sleeve 10 shown in FIG. 2A by 180°. The case shown in FIG. 2A gives a maximum incident angle represented by θ+δ, and the case shown in FIG. 2B gives a minimum incident angle represented by |θ−δ|.

When the sleeve 10 is rotated between the condition shown in FIG. 2A and the condition shown in FIG. 2B, the plane containing both the optical path OP and the axis AOS of the supporting means is gradually inclined with respect to the plane perpendicular to the optical film 14, and accordingly the incident angle upon the optical film 14 continuously changes between the maximum incident angle and the minimum incident angle. Therefore, by adjusting the rotational position of the sleeve 10, the incident angle upon the optical film 14 can be arbitrarily set to a value between the maximum incident angle and the minimum incident angle. For example, when δ=4° and θ=8°, the incident angle can be adjusted in the range of 4° to 12°. While the maximum incident angle and the minimum incident angle mentioned above are strictly applied to the inner surface (the first surface 12A) of the transparent plate 12, these angles can be approximately applied also to the optical film 14 formed on the outer surface (the second surface 12B) of the transparent plate 12.

Although the sleeve 10 is freely rotatable relative to the sleeve 8 in the above preferred embodiment, means for locking the sleeve 10 to the sleeve 8 may be provided, so as to maintain a desired incident angle or a film characteristic after obtained by rotation of the sleeve 10. Alternatively, the sleeve 10 may be fixed to the sleeve 8 by laser welding or the like after obtaining a desired incident angle.

The present invention is limited only by the condition that none of the inclination angles δ and θ is 0°. In other words, if at least one of the inclination angles δ and θ is 0°, the maximum incident angle and the minimum incident angle become equal to each other, so that the incident angle becomes constant irrespective of rotation of the sleeve 10.

Figure 3:
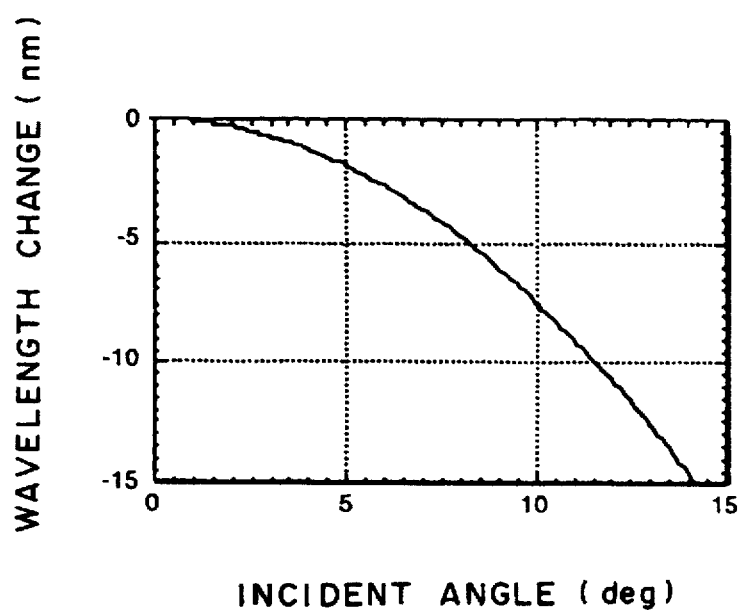
FIG. 3 is a graph showing the relation between a change in transmission center wavelength of an optical band-pass filter and an incident angle thereupon.

There will now be described the relation between the characteristic of the optical film and the incident angle upon the optical film with reference to FIG. 3. FIG. 3 is a graph showing the relation between a change in transmission center wavelength of light passing through the optical film and the incident angle in the case that the optical film functions as an optical band-pass filter. As apparent from FIG. 3, the transmission center wavelength continuously decreases with an increase in incident angle. Thus, a desired characteristic of the optical film can be obtained by changing the incident angle according to the mechanism of the present invention. Further, since the mechanism for rotating the sleeve 10 is greatly simple, the optical device can be reduced in size and cost.

Figure 4:
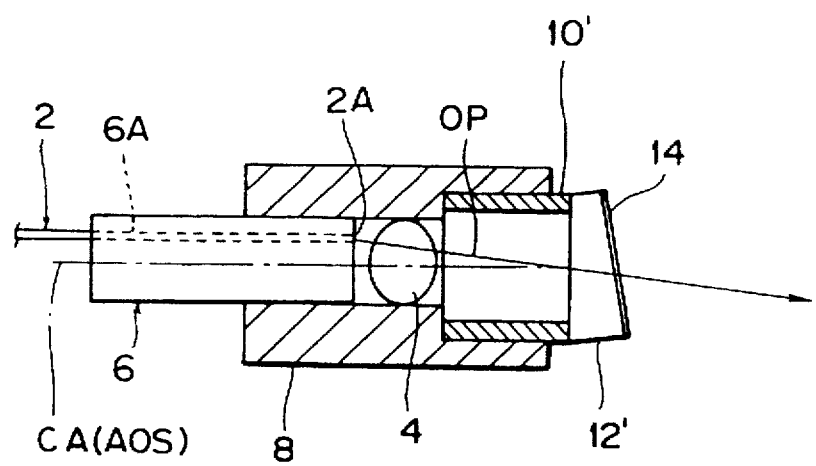
FIG. 4 is a longitudinal sectional view of an optical device showing a second preferred embodiment of the present invention.

FIG. 4 is a longitudinal sectional view of an optical device showing a second preferred embodiment of the present invention. In this preferred embodiment, the sleeve 10 and the transparent plate 12 shown in FIG. 1 are respectively replaced by a sleeve 10' having opposite end surfaces parallel to each other and a transparent plate 12' whose one end surface on which the optical film 14 is formed is inclined with respect to the other end surface. With this structure, the optical film 14 can be inclined with respect to a plane perpendicular to the axis AOS of the supporting means like the first preferred embodiment. Further, like the first preferred embodiment, the fine hole 6A of the ferrule 6 in which the optical fiber 2 is inserted is eccentric from the center axis CA of the ferrule 6, so as to incline the axis AOS with respect to the optical path OP.

By rotating the sleeve 10' relative to the sleeve 8, the incident angle upon the optical film 14 can be changed in accordance with the above-mentioned principle. Further, the mechanism for rotatably supporting the optical film 14 is greatly simple. Accordingly, also according to this preferred embodiment, the optical device having the optical film 14 that can vary the incident angle thereupon can be reduced in size and cost.

Figure 5:
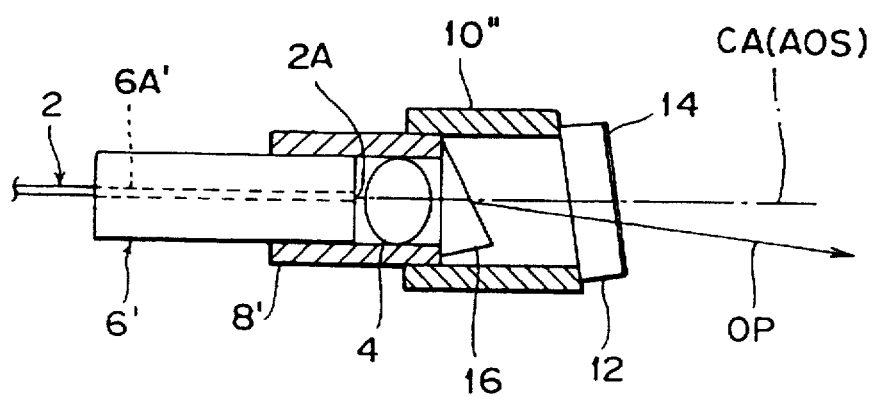
FIG. 5 is a longitudinal sectional view of an optical device showing a third preferred embodiment of the present invention.

FIG. 5 is a longitudinal sectional view of an optical device showing a third preferred embodiment of the present invention. A ferrule 6' for supporting the optical fiber 2 has a central fine hole 6A' in which the optical fiber 2 is inserted. Accordingly, the excitation end 2A of the optical fiber 2 as the excitation port is located on the center axis CA of the ferrule 6'. The lens 4 and the ferrule 6' are coaxially supported in a sleeve 8' having a smooth outer circumferential surface. If only this configuration were provided, the optical path OP of a parallel beam emerging from the lens 4 could not be inclined with respect to the axis AOS of the supporting means. In this preferred embodiment, therefore, a triangular prismatic prism 16 is fixed to an end surface of the sleeve 8', thereby inclining the optical path OP of a parallel beam output from the collimating means with respect to the axis AOS of the supporting means.

Since the triangular prismatic prism 16 is fixed to the end surface of the sleeve 8', a sleeve included in the supporting means cannot be inserted into the sleeve 8'. In this preferred embodiment, therefore, the sleeve 8' is inserted in a sleeve 10" constituting the supporting means so that the sleeve 10" can be rotated relative to the sleeve 8'. The transparent plate 12 is fixed to an inclined end surface of the sleeve 10", and the optical film 14 is formed on the transparent plate 12. The axis AOS of the supporting means as the center of rotation of the optical film 14 coincides with the center axis CA of the ferrule 6'.

With the above configuration of this preferred embodiment, the optical path OP can be inclined with respect to the axis AOS of the supporting means, and the optical film 14 can be inclined with respect to a plane perpendicular to the axis AOS. Accordingly, the incident angle can be adjusted by rotating the sleeve 10" relative to the sleeve 8'. Further, since the mechanism for rotating the sleeve 10" is greatly simple, the optical device can be reduced in size and cost.

Figure 6:
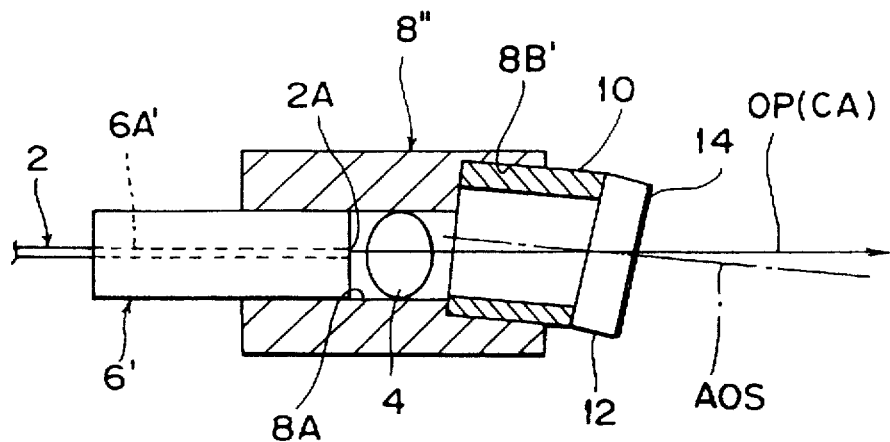
FIG. 6 is a longitudinal sectional view of an optical device showing a fourth preferred embodiment of the present invention.

FIG. 6 is a longitudinal sectional view of an optical device showing a fourth preferred embodiment of the present invention. In this preferred embodiment, the same ferrule 6' as that used in the third preferred embodiment shown in FIG. 5 is used, so that the optical path OP of a parallel beam emerging from the lens 4 coincides with the center axis CA of the ferrule 6'. To incline the axis AOS of the supporting means with respect to the optical path OP, the sleeve 10 is obliquely inserted in a sleeve 8". More specifically, the sleeve 8" has an insert hole 8A having a relatively small diameter for receiving and fixing the lens 4 and the ferrule 6' therein and an insert hole 8B' having a relatively large diameter for slidably rotatably receiving the sleeve 10. The insert hole 8B' is inclined with respect to the insert hole 8A. Like the previous preferred embodiments, the optical film 14 is inclined with respect to a plane perpendicular to the axis AOS of the supporting means.

The incident angle upon the optical film 14 can be adjusted by rotating the sleeve 10 relative to the sleeve 8". Further, since the mechanism for rotating the sleeve 10 relative to the sleeve 8" is greatly simple, the optical device can be reduced in size and cost.

Figure 7:
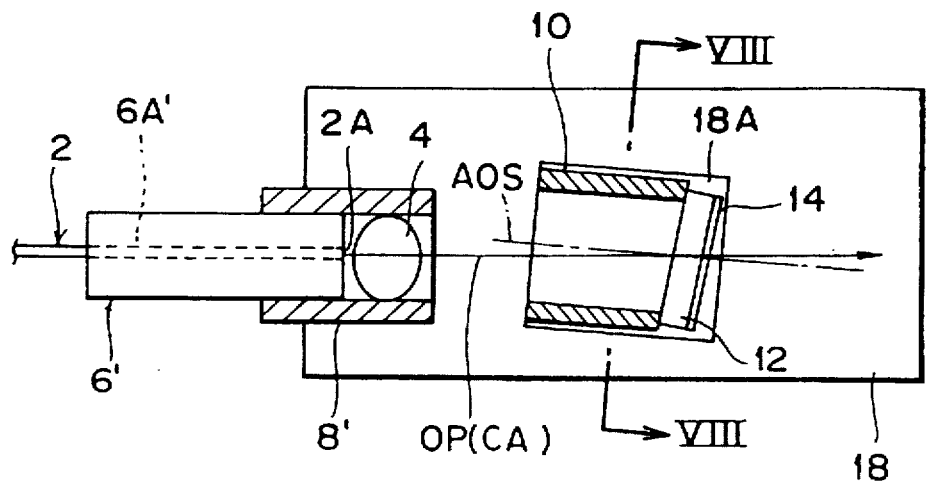
FIG. 7 is a longitudinal sectional view of an optical device showing a fifth preferred embodiment of the present invention.
Figure 8:
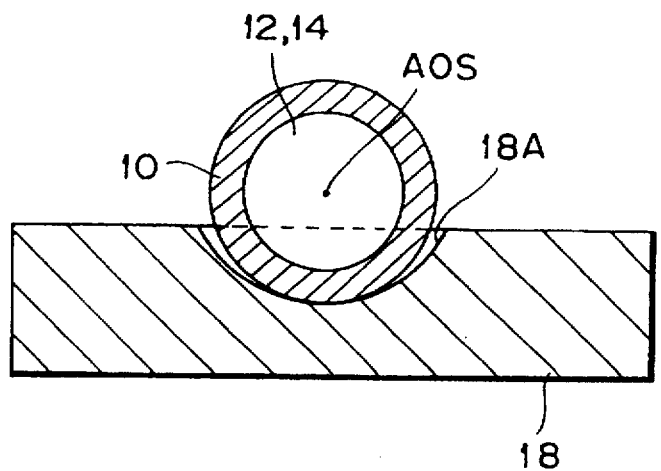
FIG. 8 is a transverse sectional view of the optical device shown in FIG. 7.

FIGS. 7 and 8 are a longitudinal sectional view and a transverse sectional view, respectively, of an optical device showing a fifth preferred embodiment of the present invention. That is, FIG. 8 is a cross section taken along the line VIII—VIII in FIG. 7. The optical fiber 2 is inserted and fixed in the central fine hole 6A' of the ferrule 6'. The lens 4 and the ferrule 6' are coaxially supported in the sleeve 8'. The sleeve 8' is fixed to a substrate 18 by laser welding, for example. The optical path OP of a parallel beam emerging from the lens 4 coincides with the center axis CA of the ferrule 6'. To incline the axis AOS of the supporting means with respect to the optical path OP, the sleeve 10 is slidably rotatably seated in a groove 18A obliquely formed on the substrate 18. The groove 18A has a substantially semicylindrical shape defined as a locus of generators (generatrices) inclined at a given angle with respect to the optical path OP. The generators are parallel to the axis AOS of the supporting means. The transparent plate 12 is fixed to the inclined end surface of the sleeve 10, so as to incline the optical film 14 with respect to a plane perpendicular to the axis AOS of the supporting means.

The incident angle upon the optical film 14 can be adjusted by rotating the sleeve 10 within the groove 18A. Alternatively, a desired incident angle can be maintained by fixing the sleeve 10 to the substrate 18 by laser welding or the like after obtaining the desired incident angle or a film characteristic by the rotation of the sleeve 10. Although the diameter of the groove 18A is larger than the outer diameter of the sleeve 10 as shown, the former and the latter may be made substantially equal to each other, thereby reducing fluctuations of the center of rotation of the optical film 14, that is, the axis AOS of the supporting means. Also in this preferred embodiment, the optical device having the optical film 14 that can vary the incident angle thereupon can be reduced in size and cost.

Figure 9:
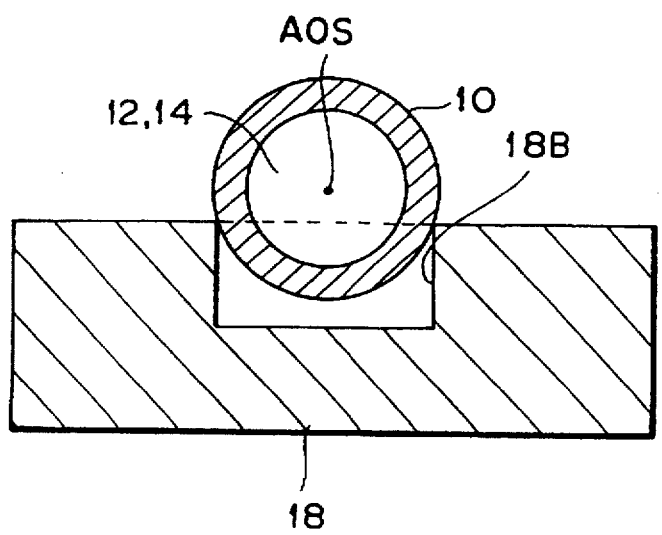
FIG. 9 is a transverse sectional view of an optical device showing a modification of the fifth preferred embodiment shown in FIGS. 7 and 8.

FIG. 9 is a transverse sectional view of an optical device showing a modification of the fifth preferred embodiment shown in FIGS. 7 and 8. In this modification, the groove 18A having the substantially semicylindrical shape (see FIG. 8) is replaced by a groove 18B having a prismatic shape, which is formed on the substrate 18. The longitudinal direction of the groove 18B (the direction perpendicular to the sheet plane of FIG. 9) is inclined with respect to the optical path OP (see FIG. 7), and the width of the groove 18B is set smaller than the outer diameter of the sleeve 10. Accordingly, the sleeve 10 is slidably rotatably supported on the substrate 18 in such a manner that the outer circumferential surface of the sleeve 10 is in contact with a pair of parallel longitudinal edges of a rectangular opening of the groove 18B. In this manner, the sleeve 10 is supported by the pair of parallel longitudinal edges of the groove 18B of the substrate 18, thereby allowing the determination of an accurate position of the sleeve 10.

Figure 10:
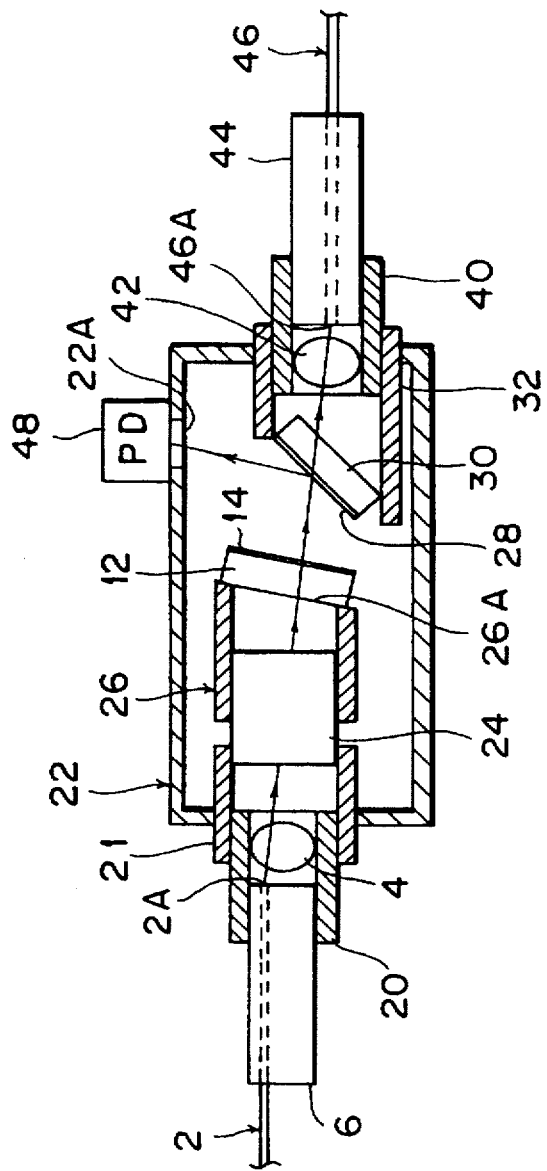
FIG. 10 is a longitudinal sectional view of an optical device showing a sixth preferred embodiment of the present invention.

FIG. 10 is a longitudinal sectional view of an optical device showing a sixth preferred embodiment of the present invention. This optical device may be used as a part of an optical amplifier including a doped fiber doped with a rare-earth element such as Er (erbium).

The excitation end 2A of the optical fiber 2 is employed as the excitation port, and the optical fiber 2 is eccentrically supported by the ferrule 6. The lens 4 is inserted and fixed in a lens holder (sleeve) 20. The ferrule 6 is inserted in the lens holder 20 up to a given depth and is fixed to the lens holder 20 by laser welding or the like. The lens holder 20 is inserted and fixed in a sleeve 21, and the sleeve 21 is fixed to a housing 22. The sleeve 21 is connected through a circular cylindrical optical isolator 24 to a sleeve 26. The sleeve 26 has an inclined end surface 26A, and the transparent plate 12 on which the optical film 14 is formed is fixed to the inclined end surface 26A of the sleeve 26. The optical isolator 24 is fixed to the sleeve 21, and the sleeve 26 is slidably rotatably mounted on the outer circumferential surface of the optical isolator 24. Accordingly, the incident angle upon the optical film 14 can be adjusted by rotating the sleeve 26.

A parallel beam passed through the optical film 14 is branched into a reflected beam and a transmitted beam by a coupler film 28. The coupler film 28 is formed on a glass plate 30, and the glass plate 30 is supported by a holder 32. The holder 32 is fixed to the housing 22. A lens holder 40 is inserted and fixed in the holder 32, and a lens 42 is inserted and fixed in the lens holder 40. A ferrule 44 is also inserted and fixed in the lens holder 40, and an output optical fiber 46 is held at its end portion in the ferrule 44. The transmitted beam from the coupler film 28 is converged by the lens 42 and is coupled to an excitation end 46A of the optical fiber 46. The reflected beam from the coupler film 28 enters a photodetecting region of a photodiode 48 through an opening 22A formed through the wall of the housing 22. The photodiode 48 is fixed to the outer surface of the housing 22.

A doped fiber (not shown) pumped by a pumping light source (not shown) is connected to the upstream side of the optical fiber 2. In the doped fiber, Er for example is selected as a dopant for amplifying signal light having a wavelength band of 1.55 µm, and in this case the wavelength band of pumping light from the pumping light source is set to 1.48 µm, for example. To monitor the power of the amplified signal light by the use of the photodiode 48, the optical film 14 has a function of an optical band-pass filter. In a wavelength-division multiplexing (WDM) system, the wavelength of signal light applied has an accuracy on the order of 1 nm. Accordingly, to accurately monitor the power of the amplified signal light in the WDM system, the transmission center wavelength of the optical film 14 (optical band-pass filter) is preferably set with a high accuracy of 1 nm or less.

Figure 11:
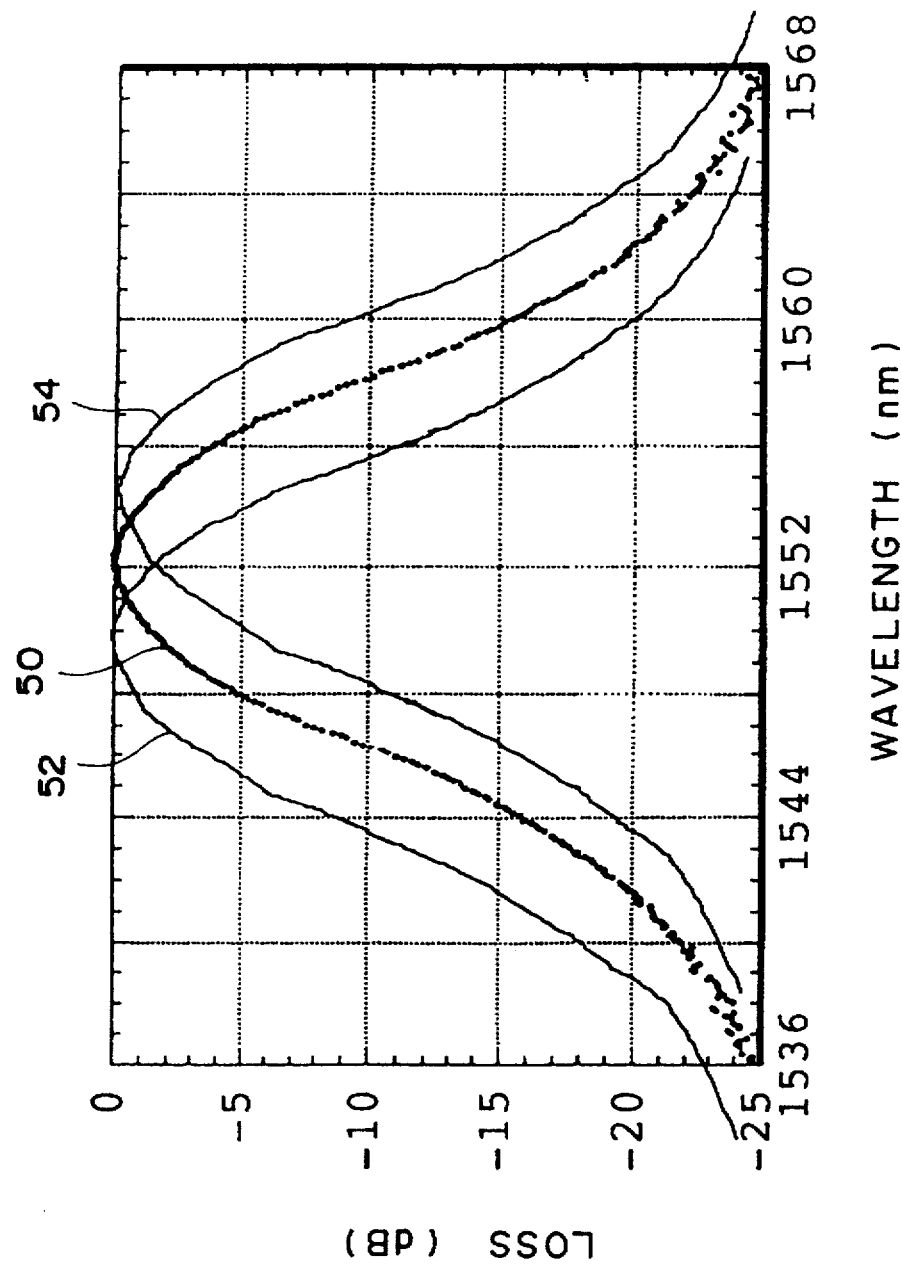
FIG. 11 is a graph showing the relation between transmission loss in an optical band-pass filter and wavelength.

FIG. 11 is a graph showing the relation between transmission loss (dB) in an optical band-pass filter and wavelength (nm). In the case that the wavelength of signal light is set to 1552 nm, the optical film 14 in the optical device shown in FIG. 10 is required to have a characteristic as shown by reference numeral 50. It is difficult to set such a characteristic by specifying only the manufacturing conditions of the optical film. In the optical device shown in FIG. 10, the characteristic of the optical film 14 can be changed between a characteristic shown by reference numeral 52 and a characteristic shown by reference numeral 54, by rotating the sleeve 26 to adjust the incident angle upon the optical film 14. Accordingly, the manufacturing conditions of the optical band-pass filter having a high-accuracy characteristic can be relaxed.

The power ratio between the reflected beam and the transmitted beam by the coupler film 28 is set to 1:20, for example. The result of monitoring by the photodiode 48 is used for automatic level control (ALC), for example. In a general ALC loop, the power of pumping light is controlled so that the output level from a photodiode becomes constant, thereby maintaining the output level from an optical amplifier at a constant value.

The reason for use of the optical isolator 24 is to prevent the occurrence of oscillation or the like due to an optical resonator structure including the doped fiber as an optical amplifying medium.

Although the excitation end of the optical fiber is used as the excitation port in the above preferred embodiments, the present invention is not limited to this configuration. For example, a light source such as a laser diode may be used as the excitation port. The term of "parallel beam" used in "the collimating means converts light emitted from the excitation port into a parallel beam and outputs the parallel beam onto the optical path" must be widely interpreted. That is, it should be understood that the "parallel beam" is not limited to a bundle of light rays as a collection of parallel rays of light, but also includes a bundle of light rays diverging or converging with a numerical aperture (NA) smaller than that of an emitted beam from the excitation port. In the case that the collimating means converts light emitted from the excitation port into a bundle of light rays as a collection of parallel rays of light, and outputs the bundle of light rays onto the optical path, the incident angles of all the light rays upon the optical film becomes accurately equal to each other, so that the characteristic of the optical film can be set highly accurately.

As described above, according to the present invention, it is possible to provide an optical device having an optical film that can vary an incident angle thereon which is fit for a reduction in size and cost.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
    a collimating means for converting light emitted from an excitation port into a parallel beam and outputting said parallel beam onto an optical path;
    an optical film provided so as to pass said parallel beam output from said collimating means; and
    a supporting means having an axis inclined with respect to said optical path, for supporting said optical film so that said optical film is rotatable about said axis, wherein
    said axis is not perpendicular to said optical path, and said optical film is inclined with respect to a plane perpendicular to said axis and is not parallel to said axis.

2. An optical device according to claim 1, wherein said excitation port is an excitation end of an optical fiber, and said collimating means comprises a lens opposed to said excitation end of said optical fiber.

3. An optical device according to claim 2, wherein said collimating means further comprises a ferrule having a fine hole in which said optical fiber is inserted, and a first sleeve for supporting said ferrule and said lens; and said supporting means comprises a second sleeve rotatable relative to said first sleeve, and a transparent plate having a first surface fixed to an end surface of said second sleeve and a second surface on which said optical film is formed.

4. An optical device according to claim 3, wherein said ferrule has a center axis parallel to or coincident with said axis, and said fine hole is eccentric from said center axis, whereby said optical path is inclined with respect to said axis.

5. An optical device according to claim 3, wherein said collimating means further comprises a triangular prismatic prism opposed to said lens, whereby said optical path is inclined with respect to said axis.

6. An optical device according to claim 3, wherein said first sleeve has a first insert hole in which said ferrule and said lens are inserted and fixed and a second insert hole in which said second sleeve is slidably rotatably inserted, said second insert hole being inclined with respect to said first insert hole, whereby said optical path is inclined with respect to said axis.

7. An optical device according to claim 3, further comprising a substrate on which said first sleeve is fixed, said substrate having a groove having a semicylindrical shape defined as a locus of generatorices inclined with respect to said optical path;

wherein said second sleeve is slidably rotatably seated in said groove, whereby said optical path is inclined with respect to said axis.

8. An optical device according to claim 3, further comprising a substrate on which said first sleeve is fixed, said substrate having a groove having a prismatic shape inclined with respect to said optical path;

wherein said second sleeve is slidably rotatably seated on opposite edges of said groove, whereby said optical path is inclined with respect to said axis.

9. An optical device according to claim 3, wherein said end surface of said second sleeve is inclined with respect to said plane, whereby said optical film is inclined with respect to said plane.

10. An optical device according to claim 3, wherein said end surface of said second sleeve is substantially perpendicular to said axis, and said first surface of said transparent plate is inclined with respect to said second surface, whereby said optical film is inclined with respect to said plane.

11. An optical device according to claim 1, further comprising:

a means for branching said parallel beam passed through said optical film into first and second branch beams; and a photodiode for receiving said first branch beam and converting said first branch beam into an electrical signal according to power of said first branch beam to output said electrical signal;

said second branch beam being output from an output port.

12. An optical device according to claim 11, wherein:

said excitation port is an excitation end of a first optical fiber;

said collimating means comprises a first lens opposed to said excitation end of said first optical fiber;

said output port is an excitation end of a second optical fiber; and said optical device further comprises a second lens for converging said second branch beam to couple said second branch beam to said excitation end of said second optical fiber.

13. An optical device according to claim 1, wherein said optical film comprises a dielectric multilayer film.

14. An optical device according to claim 1, wherein said optical film comprises an optical band-pass filter.

15. An optical device comprising:

a collimating means for converting light emitted from an excitation port into a parallel beam and outputting said parallel beam onto an optical path;

an optical film provided so as to pass said parallel beam output from said collimating means; and a supporting means having an axis inclined with respect to said optical path, for supporting said optical film so that said optical film is rotatable about said axis, wherein said optical film is inclined with respect to a plane perpendicular to said axis, said excitation port is an excitation end of an optical fiber, said collimating means comprises a lens opposed to said excitation end of said optical fiber, said collimating means further comprises a ferrule having a fine hole in which said optical fiber is inserted, and a first sleeve for supporting said ferrule and said lens, and said supporting means comprises a second sleeve rotatable relative to said first sleeve, and a transparent plate having a first surface fixed to an end surface of said second sleeve and a second surface on which said optical film is formed.

16. An optical device according to claim 15, wherein said ferrule has a center axis parallel to or coincident with said axis, and said fine hole is eccentric from said center axis, whereby said optical path is inclined with respect to said axis.

17. An optical device according to claim 15, wherein said collimating means further comprises a triangular prismatic prism opposed to said lens, whereby said optical path is inclined with respect to said axis.

18. An optical device according to claim 15, wherein said first sleeve has a first insert hole in which said ferrule and said lens are inserted and fixed and a second insert hole in which said second sleeve is slidably rotatably inserted, said second insert hole being inclined with respect to said first insert hole, whereby said optical path is inclined with respect to said axis.

19. An optical device according to claim 15, further comprising:

a substrate on which said first sleeve is fixed, said substrate having a groove having a semicylindrical shape defined as a locus of generatorices inclined with respect to said optical path, wherein said second sleeve is slidably rotatably seated in said groove, whereby said optical path is inclined with respect to said axis.

20. An optical device according to claim 15, further comprising:

a substrate on which said first sleeve is fixed, said substrate having a groove having a prismatic shape inclined with respect to said optical path, wherein said second sleeve is slidably rotatably seated on opposite edges of said groove, whereby said optical path is inclined with respect to said axis.

21. An optical device according to claim 15, wherein said end surface of said second sleeve is inclined with respect to said plane, whereby said optical film is inclined with respect to said plane.

22. An optical device according to claim 15, wherein said end surface of said second sleeve is substantially perpendicular to said axis, and said first surface of said transparent plate is inclined with respect to said second surface, whereby said optical film is inclined with respect to said plane.

23. An optical device comprising:

an optical film passing a parallel beam travelling along an optical path; and a supporting mechanism supporting the optical film to be rotatable about a main axis which is inclined with respect to the optical path, wherein the main axis is not perpendicular to the optical path, and the optical film is not parallel to the main axis and is inclined with respect to a plane perpendicular to the main axis.

24. An optical device according to claim 23, further comprising:

a first optical fiber having an excitation end; and a lens opposed to the excitation end of the first optical fiber, wherein light emitted from the excitation end of the first optical fiber is collimated by the lens to be the parallel beam emitted along the optical path.

25. An optical device according to claim 24, further comprising:

a ferrule having a hole in which the first optical fiber is inserted; and a first sleeve supporting the ferrule and the lens, wherein the support mechanism comprises a second sleeve rotatable relative to the first sleeve, and a transparent plate having a first surface fixed to an end surface of the second sleeve and a second surface on which the optical film is formed.

26. An optical device according to claim 25, wherein the ferrule has a center axis parallel to or coincident with the main axis, and the hole of the ferrule is eccentric from the center axis.

27. An optical device according to claim 25, further comprising:

a triangular prismatic prism opposed to the lens.

28. An optical device according to claim 25, wherein the first sleeve has a first insert hole in which the ferrule and the lens are inserted and fixed and a second insert hole in which the second sleeve is slidably rotatably inserted, the second insert hole being inclined with respect to the first insert hole.

29. An optical device according to claim 25, further comprising:

a substrate on which the first sleeve is fixed, the substrate having a groove having a semicylindrical shape defined as a locus of generatorices inclined with respect to the optical path, wherein the second sleeve is slidably rotatably seated in the groove.

30. An optical device according to claim 25, further comprising:

a substrate on which the first sleeve is fixed, the substrate having a groove having a prismatic shape inclined with respect to the optical path, wherein the second sleeve is slidably rotatably seated on opposite edges of the groove.

31. An optical device according to claim 25, wherein the end surface of the second sleeve is inclined with respect to the plane.

32. An optical device according to claim 25, wherein the end surface of the second sleeve is substantially perpendicular to the axis, and the first surface of the transparent plate is inclined with respect to the second surface.

33. An optical device according to claim 25, further comprising:

a branching mechanism branching the parallel beam passed through the optical film into first and second branch beams; and a photodiode receiving the first branch beam and converting the first branch beam into an electrical signal.

34. An optical device according to claim 33, further comprising:

a second optical fiber; and a lens converging the second branch beam to couple the second branch beam to the second optical fiber.

35. An optical device according to claim 23, wherein the optical film is a dielectric multilayer film.

36. An optical device according to claim 23, wherein the optical film is an optical band-pass filter.

37. An optical device comprising:

an optical fiber having an excitation end;

a lens opposed to the excitation end, the lens converting light emitted from the excitation end into a parallel beam and outputting the parallel beam onto an optical path;

an optical film passing the parallel beam;

a first sleeve supporting the optical fiber and the lens; and a second sleeve having an axis inclined with respect to the optical path, the second sleeve supporting the optical film so that the optical film is rotatable about the axis, wherein the optical film is inclined with respect to a plane perpendicular to the axis.

* * * * *

UNITED STATES PATENT AND TRADEMARK OFFICE
CERTIFICATE OF CORRECTION

PATENT NO. : 5,801,892

DATED : September 1, 1998

INVENTOR(S) : Naganuma et al.

It is certified that error appears in the above-indentified patent and that said Letters Patent is hereby corrected as shown below:

Cover Page, Column 2, "FOREIGN PATENT DOCUMENTS", add
--PATENT ABSTRACTS OF JAPAN, Vol. 014, No. 340,
(P-1080), July 23, 1990 & JP 02118503A
(NIPPON TELEGR & TELEPH CORP), 05/02/90--.

Signed and Sealed this

Fifth Day of January, 1999

Attest:

*Attesting Officer*   *Acting Commissioner of Patents and Trademarks*